Aug. 19, 1969  S. A. REDMAN  3,462,058

SELF-ADHERING FEED ROLL

Filed Nov. 20, 1967

INVENTOR
SAMUEL A. REDMAN

BY
HIS ATTORNEYS

> United States Patent Office 3,462,058
Patented Aug. 19, 1969

3,462,058
SELF-ADHERING FEED ROLL
Samuel A. Redman, Kettering, Ohio, assignor to The National Cash Register Company, Dayton, Ohio, a corporation of Maryland
Filed Nov. 20, 1967, Ser. No. 684,274
Int. Cl. B65h 17/20
U.S. Cl. 226—191    5 Claims

ABSTRACT OF THE DISCLOSURE

A self-adhering feed roll comprising a molded tire or ring of polyurethane material, the diameter of which is less than the diameter of the hub on which it is mounted, which pre-loads the tire, thereby preventing any slippage of the tire on the hub. The inner surface of the tire is molded with finger-like projections formed at an acute angle with the outer surface of the hub. The outer surface of the hub contains a series of horizontal grooves which coact with the finger-like projections to further allow the tire to resist any sliding movement on the hub. The outer surface of the tire is molded with radial cogs to assist in moving very friable material.

Background of the invention

The invention is directed to a feed roll used in business machines to move paper and other forms associated with the machine. Prior feed rolls have had the rubber portion bonded to the metal drive hub, which requires a vulcanizable adhesive layer between the hub and the tire. When the tire was worn and needed replacement, or was defective, the business machine on which the roll was located was required to be shut down while the roll was replaced, resulting in an interruption of the business system in which the machine was being used.

It is, therefore, an object of this invention to provide a feed roll in which the tire portion is easily removable while still retaining the driving action of the roll bonded to the hub by conventional means.

It is another object of this invention to provide a feed roll which can move all types of business forms with a minimum of feed roll pressure.

Summary of the invention

A self-adhering feed roll including a replaceable tire member composed of a polyurethane material mounted in a stress or pre-load condition on a metal hub, the tire member having a plurality of angulated projections depending from its inner surface which engage horizontal ridges located in the outer surface of the hub at an angle of 45 degrees. The outer surface of the tire member contains a plurality of radial cogs to provide a high degree of drag under minimum feed roll pressures.

Description of the preferred embodiment

Figure 2:
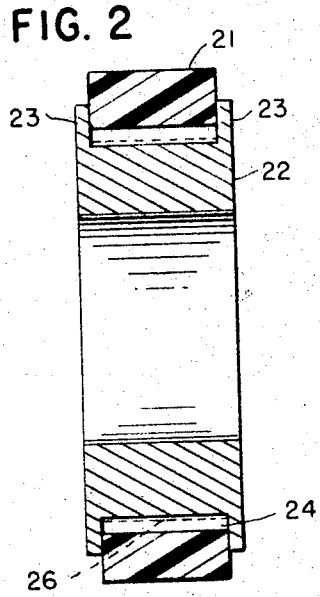
FIGURE 2 is a sectional view of the feed roll taken on the line 2—2 of FIGURE 1.
Figure 1:
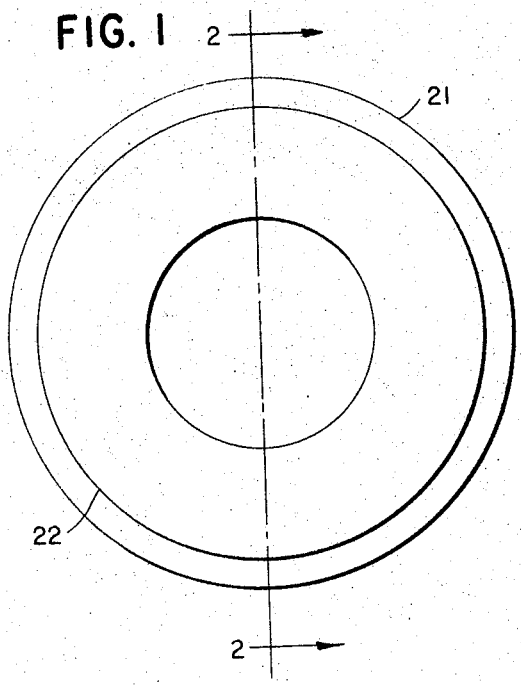
FIGURE 1 is a side view of the feed roll.

Referring now to FIGURES 1 and 2, there is shown a feed roll comprising a molded tire or ring 21 composed of a polyurethane material mounted on a metal hub 22. The hub 22 is grooved to provide a pair of side retaining walls 23.

Figure 3:
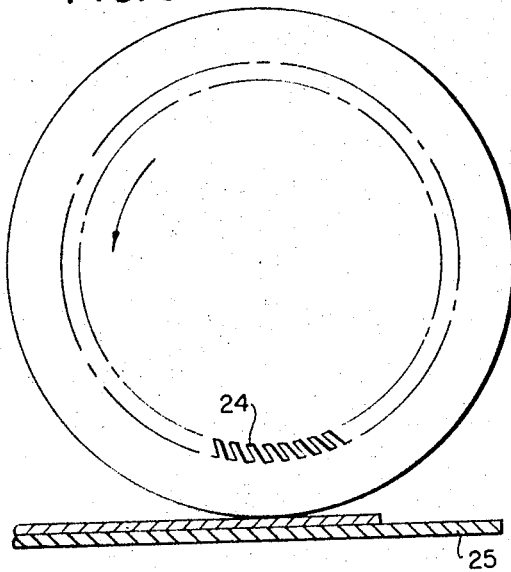
FIGURE 3 is a side detailed view of the tire showing its directional rotation with regard to a driven paper member.
Figure 4:
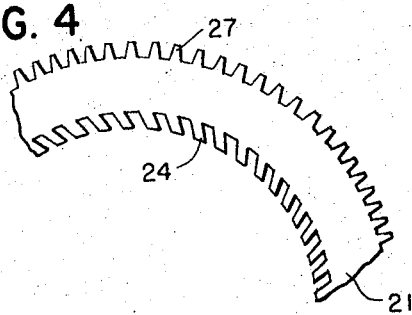
FIGURE 4 is a partial detailed view of another embodiment of the tire member.

The molded tire or ring 21 has a plurality of finger-like projections 24 (FIGURES 3 and 4) extending from the inner surface of the tire. The projections are all formed to make an angle of 45 degrees with the surface of the hub, each projection overlapping its adjacent projection, as shown in FIGURE 3. It has been discovered that the angle is quite critical, in that any variation with this angle reduces the effective gripping action of the tire accordingly.

The inside diameter of the tire is less than the outside diameter of the peripheral surface of the groove, so that, when the tire is mounted on the hub, the tire will be elongated or stretched to fit. This action pre-loads the tire, so that it is under stress at all times, therefore pulling against the surface of the hub. Under this pre-load condition, each projection 24 will engage a portion of an adjacent projection.

The tire 21 is positioned on the hub 22 so that the direction of the angle formed by the projections 24 is opposite to the direction of the drive of the feed roll. This condition is shown in FIGURE 3, where the direction of feed of the paper 25 by the feed roll 21 is to the right, with the feed roll moving counter-clockwise, as indicated by the arrow. As contact between the feed roll and the paper occurs, the force of moving the paper effects an equal and opposite reaction to the tire, with the result that the tire portion 21 tends to move clockwise on the hub 22. The projections 24, in combination with the pre-loaded condition of the tire, eliminate any possibility of tire slippage caused by this driving action under normal operating conditions.

To further reduce the possibility of slippage, the hub 22 may be provided with a series of longitudinal grooves 26 (FIGURE 2) cut in the peripheral surface of the hub. The ends of the projections 24 of the tire will engage the grooves, thus making slippage by the tire portion of the feed roll more difficult.

The tire can be molded of any type of polyurethane material having a short temperature modulus profile. For the average type of material used in business forms today, a polyurethane material having a hardness of 80 to 90 durometers (Shore A) is sufficient. In those cases where the forms are composed of a very soft and friable material, it has been found that, if the outer surface of the tire 21 of the feed roll is molded with radial cogs 27 (FIGURE 4) approximately .040 inch in length, the cogs being wide at the base while tapering slightly to the end, sufficient drag is established to move the forms. The width of each cog would be dependent upon the degree of compressibility, or "softness," of the tire that is desired. If an extremely soft material were desired, the cogs would be extremely thin and, therefore, quite prone to be compressed upon contact between the feed roll and the material to be moved. Thus it will be seen that the feed roll of the present invention can be adapted for any type of material moving, while retaining the advantages of no slippage and easy changeability of the tire.

While the form of the invention shown and described herein is admirably adapted to fulfill the objects primarily stated, it is to be understood that it is not intended to confine the invention to the particular form or embodiment disclosed herein, for it is susceptible of embodiment in various other forms.

What is claimed is:
1. A self-adhering feed roll comprising
   (a) a hub member having side portions along its outer peripheral edge forming a groove;
   (b) and a ring of resilient material positioned within said groove, said ring having an inside diameter smaller than the outside diameter of the hub member and including a plurality of finger-like projections extending inwardly at an acute angle from its inner peripheral surface, said projections being ori- entated so that they engage said hub member at an acute angle, the direction of which is opposite to the direction of rotation of the feed roll.

2. The self-adhering feed roll of claim 1 in which each projection overlaps its adjacent projection, so that in a compressed condition, each projection engages its adjacent projection.

3. The self-adhering feed roll of claim 2 in which the acute angle of the projection is 45 degrees with the hub member.

4. The self-adhering feed roll of claim 1 in which the outer peripheral edge of said hub member contains a plurality of horizontal extending grooves, said grooves coacting with the finger-like projections of said ring of resilient material to condition said ring against any movement on said hub during the operation of said feed roll.

5. The self-adhering feed roll of claim 3 in which the outer peripheral edge of said ring of resilient material is composed of a plurality of radially-extending tapered cogs for resisting slippage by the feed roll on the driven material.

References Cited

UNITED STATES PATENTS

| | | | |
|---|---|---|---|
| 2,292,851 | 8/1942 | Tykal | 226—191 |
| 2,356,842 | 8/1944 | Helmond | 226—191 X |
| 3,187,409 | 6/1965 | Glass | 226—191 X |
| 3,310,214 | 3/1967 | Nesin | 226—191 X |

ALLEN N. KNOWLES, Primary Examiner